US012673277B2

(12) United States Patent
Salbaum et al.

(10) Patent No.: US 12,673,277 B2
(45) Date of Patent: Jul. 7, 2026

(54) FILTER PLATE

(71) Applicant: JVK FILTRATION SYSTEMS GMBH, Nuremberg (DE)

(72) Inventors: Bernhard Salbaum, Röttenbach (DE); Uwe Gradl, Nuremberg (DE); Alexis Speck, Nuremberg (DE)

(73) Assignee: JVK FILTRATION SYSTEMS GMBH, Nuremberg (DE)

( * ) Notice: Subject to any disclaimer, the term of this patent is extended or adjusted under 35 U.S.C. 154(b) by 585 days.

(21) Appl. No.: 18/013,686

(22) PCT Filed: Jun. 29, 2021

(86) PCT No.: PCT/EP2021/067778
§ 371 (c)(1),
(2) Date: Dec. 29, 2022

(87) PCT Pub. No.: WO2022/002895
PCT Pub. Date: Jan. 6, 2022

(65) Prior Publication Data
US 2023/0356117 A1 Nov. 9, 2023

(30) Foreign Application Priority Data
Jul. 2, 2020 (DE) ..................... 10 2020 117 538.8

(51) Int. Cl.
*B01D 25/21* (2006.01)
*B01D 25/164* (2006.01)

(52) U.S. Cl.
CPC ......... *B01D 25/215* (2013.01); *B01D 25/164* (2013.01)

(58) Field of Classification Search
CPC ... B01D 25/215; B01D 25/164; B01D 25/001
See application file for complete search history.

(56) References Cited

U.S. PATENT DOCUMENTS 3,497,065 A * 2/1970 Walter, Jr. ............ B01D 25/215
210/231
3,669,267 A 6/1972 Hutton
(Continued)

FOREIGN PATENT DOCUMENTS

CH 604820 A5 3/1975
CN 101175543 A 5/2008
(Continued)

OTHER PUBLICATIONS

ISA for PCT/EP2021/067778 Application; Dated Sep. 13, 2022; 17 pages.
(Continued)

*Primary Examiner* — Liam Royce
(74) *Attorney, Agent, or Firm* — Rimon Law, P.C.

(57) ABSTRACT

Filter plate with a central working surface and with a plate frame framing the working surface in the manner of a rim and having an increased material thickness compared to the working surface in such a way that the plate frame projects vertically from the plane of the working surface at least on one side, wherein the central working surface and/or the plate frame and/or subassemblies or add-on parts installed in the working surface or in the plate frame have at least two regions with a different material filling density of an identical material.

7 Claims, 9 Drawing Sheets

(56)          References Cited

Figures 1, 2:
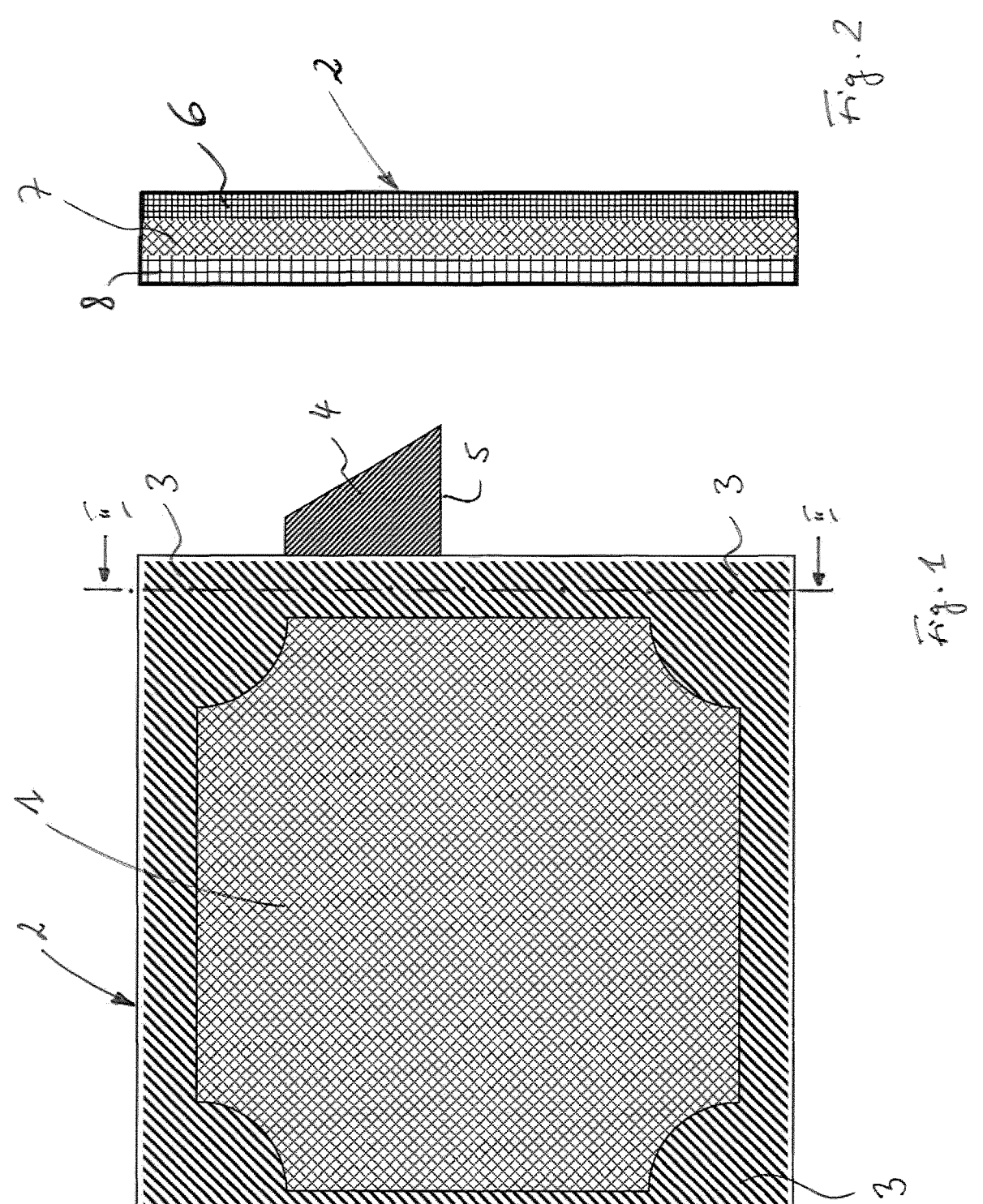

U.S. PATENT DOCUMENTS 4,045,350 A  *   8/1977  Kupf ................... B01D 25/001
                                                264/DIG. 83
4,235,721 A  *  11/1980  Nakamura .......... B01D 25/215
                                                210/350
5,484,526 A      1/1996  Bonn
5,672,272 A      9/1997  Baer

FOREIGN PATENT DOCUMENTS

| | | | |
|---|---|---|---|
| CN | 210448224 | U | 5/2020 |
| DE | 2134697 | A1 | 1/1973 |
| DE | 116758 | A1 | 12/1975 |
| DE | 1940431 | C3 | 12/1979 |
| DE | 3843250 | A1 | 7/1990 |
| DE | 202016003961 | U1 | 9/2017 |
| EA | 202390084 | B1 | 10/2024 |

OTHER PUBLICATIONS

Office Action for CN Application 202180054378.8; Dated Jul. 28, 2023; 1 page.
Office Action for EA Application 202390084; Dated Nov. 10, 2023; 5 pages.
Office Action for EP Application 217395995; Dated Jun. 26, 2024; 5 pages.
Office Action for DE Application 102020117538.8; Dated Feb. 17, 2021; 7 pages.
Office Action for EA Application 202390084; Dated May 12, 2023; 4 pages.
Office Action Issued in Chinese Application No. 202180054378.8; Dated Aug. 19, 2025; pp. 6.
Office Action Issued in European Application No. 21739599.5; Dated Jan. 15, 2026; pp. 5.

* cited by examiner

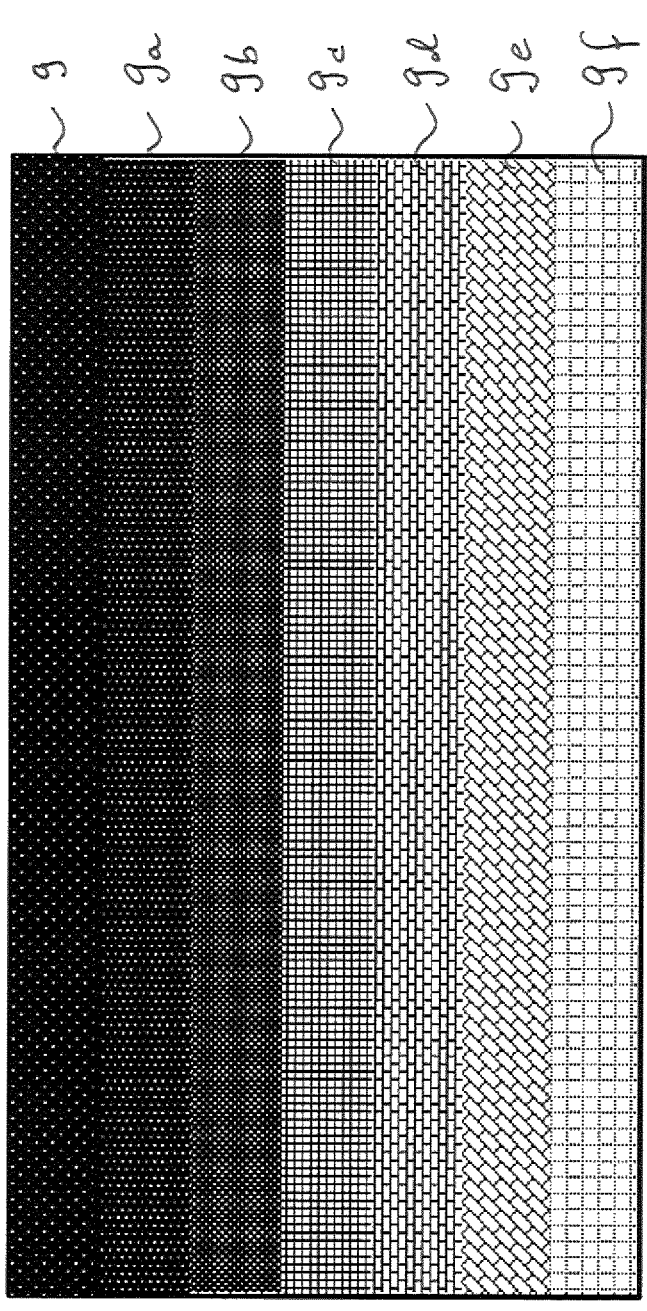

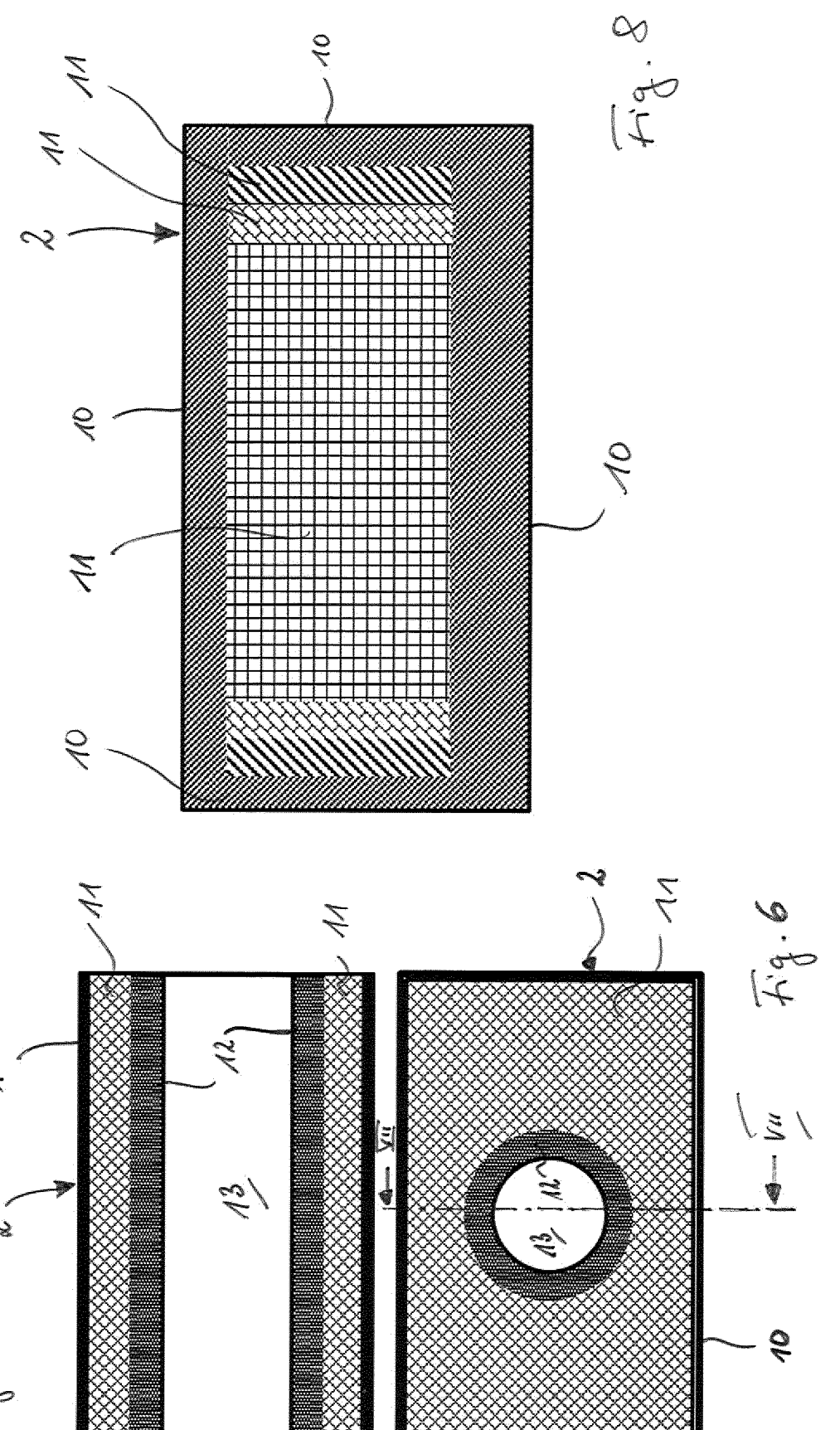

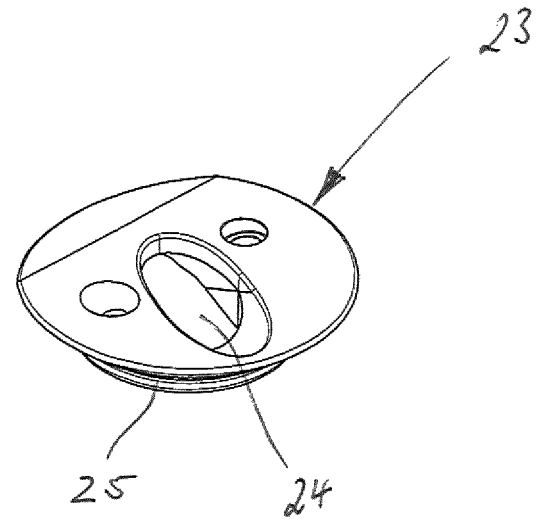
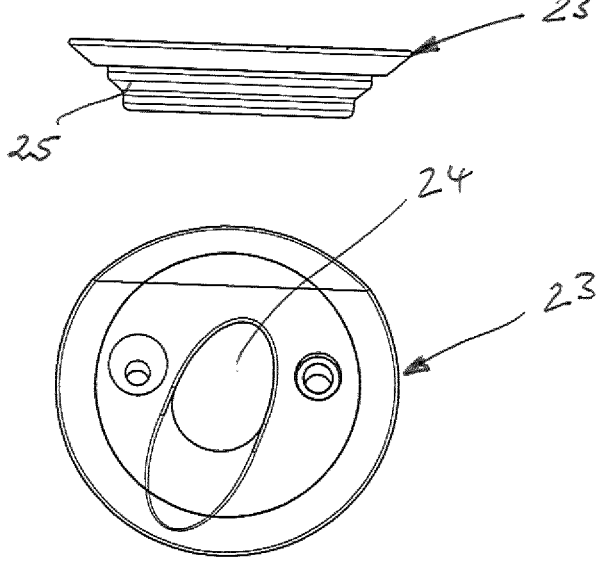
Fig. 13

FILTER PLATE

RELATED APPLICATION

The present application is a national stage application of International Patent Application Serial No. PCT/EP2021/067778, filed on Jun. 29, 2021, which claims priority from DE 10 2020 117 538.8 filed on Jul. 2, 2020, the disclosure and content of which is incorporated by reference in its entirety for all purposes.

The present invention relates to a filter plate with a central working surface and with a plate frame surrounding the working surface. The working surface can be rigid or designed as an elastic membrane. The working surface generally carries knobs on its surfaces, which serve to remove liquids in the spaces formed between the knobs. The working surface of the filter plate is therefore also referred to as a drainage field.

The plate frame frames the working surface in the manner of a rim. The plate frame protrudes vertically over at least one side of the working surface. If the plate frames of two adjacent plates projecting vertically beyond the working surface are placed next to each other, a cavity is formed which is effective as a working space, namely as a filter chamber. Usually, several such filter plates are arranged side by side to form a plurality of filter chambers arranged side by side. This type of filter plate is also called a chamber filter plate. The filter plates arranged side by side are also referred to as a plate pack.

In a further embodiment of the invention, it is possible for the plate frame to project from the working surface on both sides. Each filter plate then forms a filter chamber on both sides with its respective adjacent filter plate.

Assemblies or add-on parts built into the working surface or the plate frame can be a wide variety of parts, in particular handles, grip pieces, filtrate or suspension inlets or inlets, filtrate outlets and the like. These parts can either be attached to the filter plate or built into the filter plate, i.e. integrated.

The filter plates known from the prior art have a high dead weight. They are therefore difficult to lift and transport. In addition, very massive frames with high loadbearing capacity are required to hold a plate pack consisting of such heavy plates.

The document DD 116 758 describes a filter plate with a filter frame consisting of an outer shell of a high-density material and a foam core of another material inserted into the outer shell. For this purpose, the outer shell must first be molded in a first operation and the foam core in a second operation.

On this basis, the invention is based on the task of specifying a filter plate with the lowest possible dead weight.

This task is solved in an inventive manner by the combination of features of claim 1. The claims referred to back include further embodiments of this invention which are partly advantageous and partly inventive in themselves.

The working surface and/or the plate frame and/or assemblies or attachments built into the working surface or assemblies or add-on parts built into the plate frame have at least two areas with different material filling densities of one material in order to reduce weight. In the basic structure of the invention, therefore, only one material or substance is processed during production. A high material filling density is used where high strength or high stability of the filter plate is required. As a result of the different material filling density of different areas of the working surface or the plate frame or assemblies or add-on parts built into the working surface or the plate frame, a geometrically structured molded component is created. The working surface, the plate frame and/or assemblies or add-on parts built into the working surface or into the plate frame thus have a three-dimensional geometrically structured volume structure. Areas with high strength are densely filled with material, i.e. have a high material filling density, while other areas have only a lower material filling density.

The material filling density of the material used describes the partial material distribution. In areas with a high material filling density, a very large amount of material is introduced, in particular injected, in relation to the component volume. The material is therefore densely packed. In areas with a lower material filling density, a smaller quantity of the same material is introduced or injected in relation to the volume. The packing density of the material is therefore lower. The areas of high and low material filling density merge seamlessly into one another. The partial material distribution, i.e. the distribution of the material used in the component, is thus controlled in a targeted manner. Above all, the material can be processed in a single operation and the respective material filling density can be precisely controlled during processing of the material.

The material filling density of neighboring areas with different material filling densities merges continuously into one another. In mathematical terms, a continuously differentiable function describes the transition between two neighboring areas with different material filling densities.

The filter plate can consist entirely of one material and have areas with different material filling densities. Different materials can also be combined with each other. The different materials can be used to realize the different areas of the filter plate with different material properties. However, it is also possible to realize areas with different material filling densities within the different materials.

The first obvious advantage is the weight saving resulting from the use of such areas with different material filling densities. In addition, less material is consumed in the areas of lower density. Finally, the filter plate can be adapted to its specific application. Areas with different material filling densities can be used to control, as it were, the temperature profile in the working surface and/or in the plate frame and/or in assemblies or add-on parts installed in the working surface or in the plate frame. The same applies to the course of bending and torsion lines in the working surface and/or in the plate frame and/or in assemblies or add-on parts installed in the working surface or in the plate frame.

In an advantageous embodiment, the working surface and/or the plate frame and/or assemblies or add-on parts installed in the working surface or in the plate frame are built up in layers. Each layer built into the working surface and/or the plate frame and/or into assemblies or add-on parts has a different material filling density. The material filling density at the transitions between these layers merges continuously and not abruptly in the sense of the invention.

In a further embodiment, the plate frame is penetrated by one or more bores. The bores extend like channels inside the plate frame and thus form the outlet or inlet of the filter plate.

Since the outer walls of the filter plate are subject to particularly high stresses and are generally subjected to high loads, the outer walls of the plate frame generally have a very high material filling density. In an advantageous embodiment, the bore casing of the aforementioned bores has a similarly high, and in extreme cases even the same, material filling density as the outer walls of the plate frame. One or more intermediate layers with a lower material filling density are arranged between the outer walls of the plate frame and the bore casing, with the material filling density of all layers and intermediate layers merging continuously into one another.

In a further advantageous embodiment, the outer walls of the plate frame have a significantly higher material filling density than the bore casings. As a rule, the bore casings are subjected to far less stress than the outer walls of the plate frame. Finally, it may also be advantageous to use bore casings with a lower material filling density in order to dissipate the high temperatures of the fluids passing through the bores.

In an advantageous embodiment, geometric filling patterns are used to reduce the material filling density, for example honeycomb structures or material layers lying next to each other in a meander shape. With the different material filling densities in different areas of the filter plate, the mechanical and/or physical properties of these areas can be specifically adjusted.

Figures 4, 5:
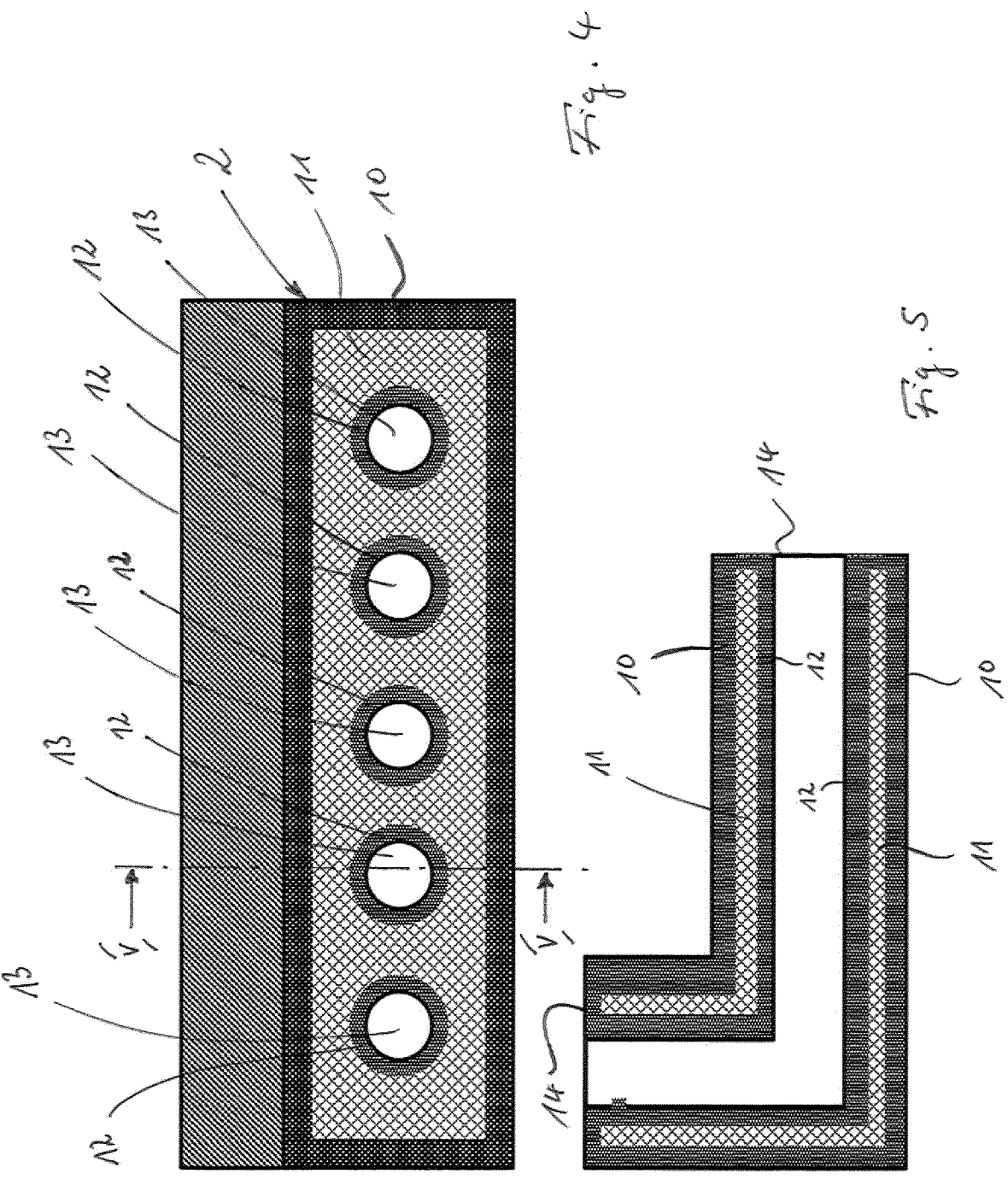
Figure 9:
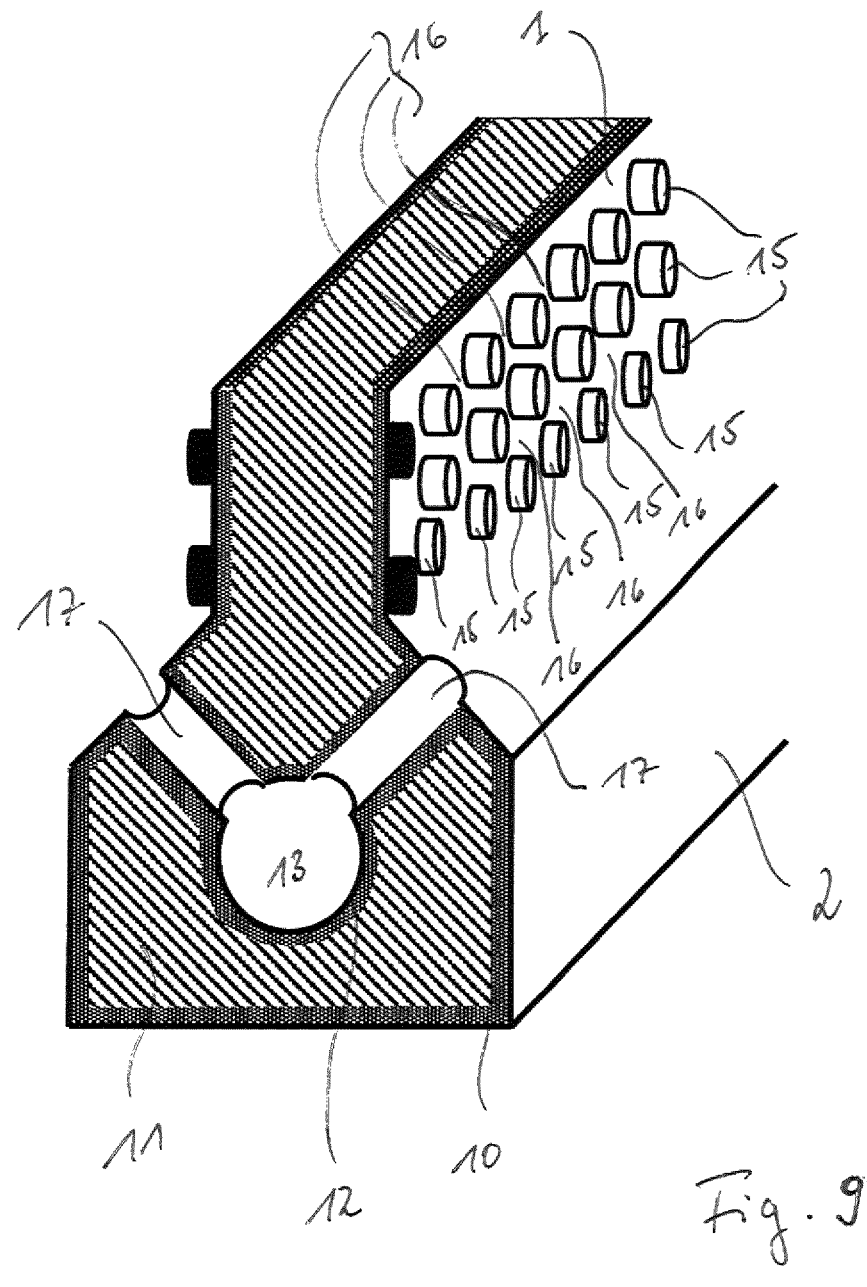
Figure 10:
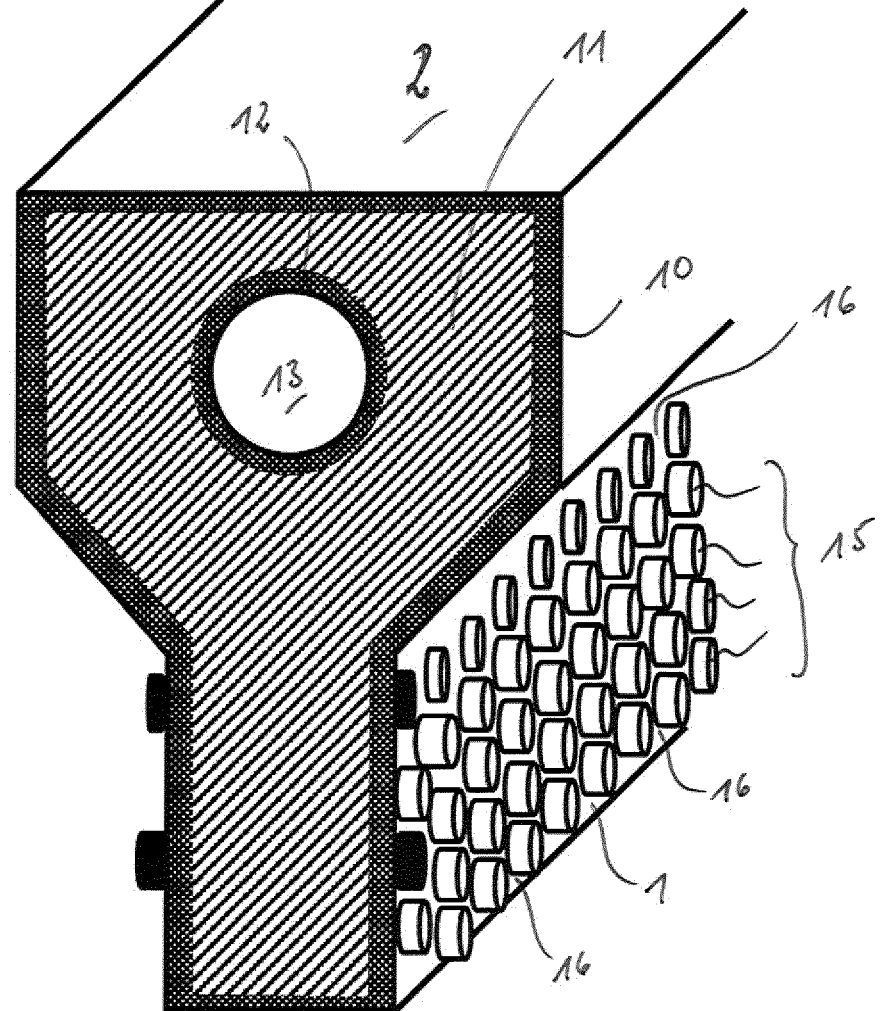
Figure 11:
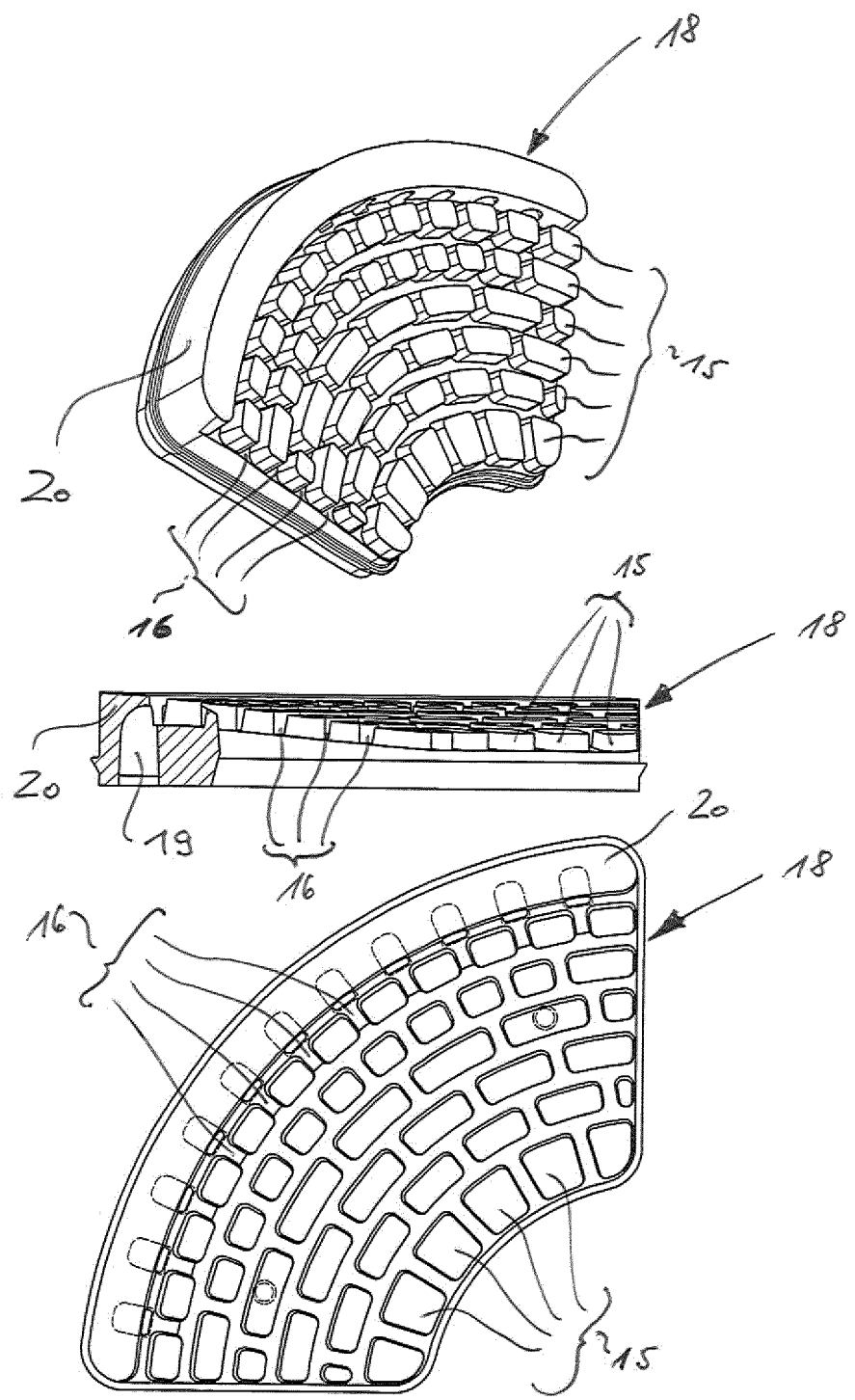
Figure 12:
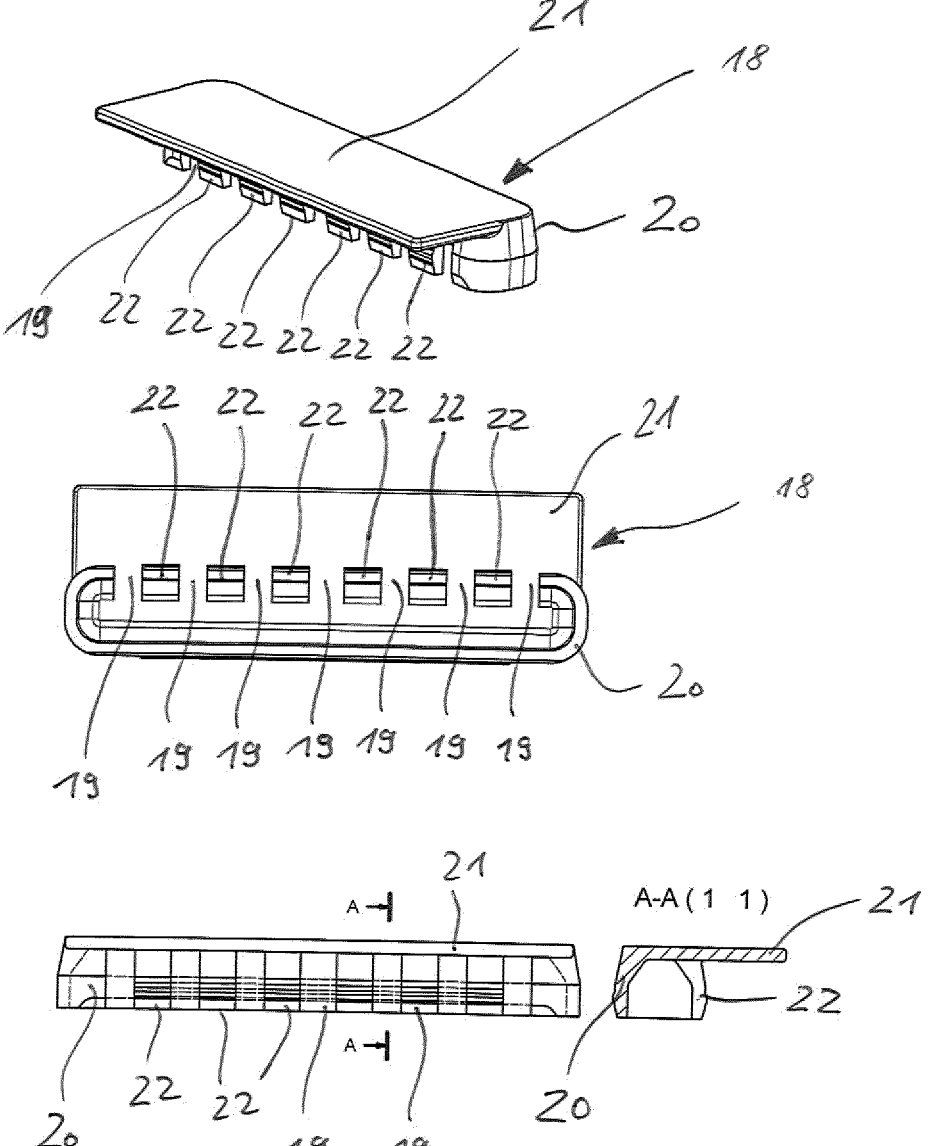

With reference to the embodiments shown in the figures of drawings, the invention is explained with further details. It shows:

FIG. 1 a top view of the filter chamber of a filter plate,

FIG. 2 the section II-II from FIG. 1,

FIG. 3 a cross-section through a plate frame with superimposed layers of different material filling density, FIG. 4 a side view of a plate frame with five adjacent adjacent holes, FIG. 5 the section V-V from FIG. 4, FIG. 6 a side view of a plate frame with a hole, FIG. 7 the section VII-VII from FIG. 6, FIG. 8 a sectional view of a plate frame, FIG. 9 a plate frame with a central bore and with inlet channels associated with the bore, FIG. 10 a plate edge with a central hole, FIG. 11 a filtrate drain insert that can be integrated into a filter plate FIG. 12 an alternative design of a filtrate drain compared to FIG. 11. use and FIG. 13 a suspension feed insert that can be integrated into a filter plate.

All drawing figures show component layers (6, 7, 8, 9a, 9b, 9c, 9d, 9e, 9f) and elements with different material filling densities. In order to clearly show the different material filling densities, the different component layers (6, 7, 8, 9a, 9b, 9c, 9d, 9e, 9f) and elements are drawn clearly delimited from each other. For the purposes of the invention, however, it applies to all adjacent component layers (6, 7, 8, 9a, 9b, 9c, 9d, 9e, 9f) and elements that their respective material filling densities merge continuously, smoothly and steadily into one another, unless expressly described otherwise.

The filter plate shown in FIG. 1 consists of a central working surface 1 and a plate frame 2 surrounding the working surface 1 on all sides. The plate frame 2 has reinforced corner areas 3. This means that the corner areas 3 project much further into the working surface 1 than the other areas of the plate frame 2. Finally, handles 4 are also attached to the outside of the plate frame 2, with which the filter plate can be lifted and carried. The undersides 5 of the handles 4 can also serve as support surfaces for placing the filter plate on a stand.

In the sectional view of FIG. 2, it can be seen that the frame is formed from a layer of high material filling density 6, from a layer of waffle-patterned material 7 and a layer of low material filling density 8.

FIG. 3 shows several component layers 9, 9a, 9b, 9c, 9d, 9e and 9f arranged side by side. While the uppermost component layer 9 is a component layer of high material filling density similar to layer 6 in FIG. 2, the component layer 9f shown at the bottom of FIG. 3 is a layer of low material filling density similar to layer 8 in FIG. 2. Viewed from the bottom layer 9f, the layer 9e above has a higher material filling density. It therefore has a denser volume. Component layer 9d again has a higher material filling density than component layers 9e and 9f. Component layer 9c has a lower material filling density than the two component layers 9b and 9a arranged above it. In other words, the material filling density of the component layers increases continuously from the lower component layer 9f to the uppermost component layer 9, with the material filling densities of adjacent component layers 9a to 9f—as already explained—merging continuously and smoothly into one another.

From the illustration of FIG. 4 it can be seen that the outer wall 10 of the plate frame 2 has a higher material filling density than the intermediate layer 11. The intermediate layer 11 is thereby arranged between the bore casings 12 of the five bores 13 arranged next to each other and the outer wall 10 of the plate frame.

In the sectional view of FIG. 5, it is clear that the outer wall 10 and the bore casing 12 are made of material with identical material filling density, although different wall thicknesses can be selected for the bore casing 12 on the one hand and the outer wall 10 on the other. The intermediate layer 11 with a lower material filling density is embedded between the outer wall 10 and the bore casing 12. The bore ends 14 have the same material filling density as the outer walls 10 and the bore casing 12.

FIG. 6 again shows an example of a bore 13. Here, the outer walls 10 of the plate frame 2 have an extremely high material filling density, while the bore casing 12 has a much lower material filling density than the outer walls 10 of the plate frame 10. However, the material filling density of the bore casing 12 is again much higher than the material filling density of the intermediate layer 11. FIG. 8 shows a plate frame 2 whose lower outer wall 10 has a higher wall thickness and thus also a higher material filling density than the upper outer wall 10. Different intermediate layers 11 with different material filling densities are arranged between the outer walls 10 in FIG. 8.

Finally, FIG. 9 shows a section of a plate frame 2 and a working surface 1 arranged in the plate frame. In this arrangement, the spaces created between the knobs 15 serve as drainage channels. The working surface 1 is therefore also referred to as a drainage field. Furthermore, the plate frame 2 in FIG. 9 again has an outer wall 10 with a high material filling density. The outer wall 10 flanks two inlet channels 17 to the bore 13. The inlet channels 17 can also be used as drains. The bore casing 12 of the bore 13 and the outer wall 10 as well as the casings of the feed channels 17 have an identical material filling density in FIG. 9.

FIG. 10 again shows a section of a filter plate with a plate frame 2 and a working surface 1 enclosed by the plate frame 2. Here, too, the working surface 1 has knobs 15 and spaces 16 arranged between the knobs 15. In the embodiment example in FIG. 10, this is another filter plate with a drainage field. Here, the outer walls 10 of the plate frame 2 have a higher material filling density than the bore casing 12 of the central bore 13. Between the bore casing 12 and the outer wall 10 of the plate frame 2 there is again an intermediate layer 11 with a lower material filling density.

FIG. 11 shows a typical filtrate drain insert 18 that can be integrated into the working surface 1 of a filter plate. Like the working surface 1, the filtrate drain insert 18 has knobs 15 and spaces 16 arranged between the knobs 15. Furthermore, the filtrate drain insert 18 has a drain edge 20 pierced by a drain opening 19. In the embodiment example, the drain edge 20 has a much higher material filling density than the other areas of the filtrate drain insert 18, for example the nubs 15.

FIG. 12 shows an alternative design to FIG. 11 of a filtrate drain insert 18 that can be integrated into the edge 2 of a filter plate. The filtrate drain insert 18 has a drain edge 20. A cover plate 21 projects from the drain edge 20 at a right angle. Teeth 22 protrude from the cover plate 21 to form a drain grid. Two adjacent teeth 22 each leave an outlet opening 19 free between them. In the embodiment example, the outlet edge 20 has a much higher material filling density than the other areas of the filtrate outlet insert 18, for example the teeth 22.

Finally, FIG. 13 shows a suspension feed insert 23 with a central feed opening 24 and a mounting collar 25 insertable into an opening not shown in FIG. 13. In the embodiment example, the mounting collar 25 has a significantly higher material filling density than the cover layer of the suspension feed insert 23 pierced by the feed opening 24.

LIST OF REFERENCE SIGNS

1 Working surface
2 Plate frame
3 Corner area
4 Handle
5 Bottom
6 Layer with high material filling density
7 waffle pattern arranged material
8 Layer with low material filling density
9 (9a to f) Component layers
10 Exterior wall
11 Intermediate layer
12 Bore casing
13 Bore
14 Bore end
15 Knob
16 Intermediate space
17 Inlet channel
18 Filtrate drain insert
19 Outlet opening
20 Drain edge
21 Cover plate
22 Tooth
23 Suspension feed insert
24 Inlet opening
25 Mounting collar

The invention claimed is:

1. A filter plate with a central working surface and with a plate frame framing the working surface in the manner of a rim and having a material thickness which is increased in comparison with the working surface in such a way that the plate frame projects vertically from the plane of the working surface at least on one side,
characterized in that
that
the central working surface and/or
the plate frame and/or
assemblies or attachments built into the working surface or plate frame
have at least two areas with different material filling density of an identical material in such a way that areas with high strength are densely filled with material, i.e. have a high material filling density, while other areas have only a lower material filling density;
wherein different areas in the central working surface and/or in the plate frame and/or assemblies or add-on parts built into the working surface and/or into the plate frame and/or assemblies or add-on parts built onto the plate frame have different geometric filling patterns for realizing a different material filling density.

2. The filter plate according to claim 1, characterized in that:
the material filling density of adjacent areas continuously merges smoothly into one another.

3. The filter plate according to claim 1, characterized in that:
the areas with different material filling density have different stiffness and/or strength.

4. The filter plate according to claim 1, characterized in that:
the central working surface and/or the plate frame and/or assemblies or add-on parts installed in the working surface or in the plate frame consist of a plurality of layers of different material filling density lying one above the other and/or next to one another.

5. The filter plate according to claim 1, characterized in that:
at least one bore passes through the central working surface
and/or the plate frame in the manner of a channel, and in that the outer walls of the plate frame and a bore casing have a higher material filling density than an intermediate layer lying between them.

6. The filter plate according to claim 5, characterized in that:
the outer walls of the central working surface and/or of the plate frame have a higher material filling density than the bore casing.

7. The filter plate according to claim 1, characterized by:
different mechanical and physical properties of different areas in the central working surface and/or in the plate frame and/or in the attached or installed assemblies or add-on parts with different material filling densities.

* * * * *